(12) United States Patent
Liu et al.

(10) Patent No.: US 9,653,012 B2
(45) Date of Patent: May 16, 2017

(54) ARRAY SUBSTRATE, DISPLAY DEVICE AND MOTHER BOARD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Chong Liu, Beijing (CN); Xiaoguang Pei, Beijing (CN); Haisheng Zhao, Beijing (CN); Zhilong Peng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 220 days.

(21) Appl. No.: 14/496,592

(22) Filed: Sep. 25, 2014

(65) Prior Publication Data

US 2015/0379907 A1    Dec. 31, 2015

(30) Foreign Application Priority Data

Jun. 26, 2014 (CN) .......................... 2014 1 0298744

(51) Int. Cl.
*G02F 1/1333* (2006.01)
*G09G 3/00* (2006.01)
*G02F 1/13* (2006.01)
*G02F 1/1362* (2006.01)

(52) U.S. Cl.
CPC ........... *G09G 3/006* (2013.01); *G02F 1/1309* (2013.01); *G02F 1/136259* (2013.01); *G02F 2001/136254* (2013.01); *G02F 2001/136272* (2013.01); *G09G 2300/0426* (2013.01)

(58) Field of Classification Search
None
See application file for complete search history.

(56) References Cited

U.S. PATENT DOCUMENTS

2009/0244420 A1* 10/2009 Chung .................. G02F 1/1309
349/40
2010/0065839 A1* 3/2010 Yamazaki ............. G02F 1/1368
257/43

* cited by examiner

*Primary Examiner* — Phu Vu
(74) *Attorney, Agent, or Firm* — Harness, Dickey & Pierce, P.L.C.

(57) ABSTRACT

The present invention provides an array substrate, a display device, and a mother board. One or more short-circuit rings are each arranged at an end of a corresponding signal line and connected to the corresponding signal line, and the short-circuit rings are serially connected through a common electrode line. The array substrate is added with a test line and a testing terminal pad, the testing terminal pad is connected to the common electrode line via the test line and is configured to apply a negative voltage onto the common electrode line connected to the test line while testing the signal line.

17 Claims, 3 Drawing Sheets

ARRAY SUBSTRATE, DISPLAY DEVICE AND MOTHER BOARD

CROSS REFERENCE OF RELATED APPLICATIONS

The present application is based on and claims the benefit of priority of Chinese Patent Application No. 201410298744.6 filed on Jun. 26, 2014, the entire contents of which are hereby incorporated by reference.

FIELD OF THE INVENTION

The present invention relates to the field of display panel manufacturing process, in particular to an array substrate, a display device, a mother board, and a detection method.

DESCRIPTION OF THE PRIOR ART

A liquid crystal display panel mainly consists of an array substrate, a counterpart substrate, and liquid crystal molecules arranged between the array substrate and the counterpart substrate. A plurality of signal lines (e.g., data signal lines and gate signal lines, etc.) for transmitting electric signals are provided at a display region of the array substrate. Along with the growing demand on a resolution of the liquid crystal display panel, there are more and more signal lines in the array substrate, and width of the respective signal lines becomes smaller and smaller. As a result, a reject rate of the signal lines which are broken (i.e., such defects as data open (DO) and gate open (GO)) becomes higher and higher.

After the array substrate is manufactured, it is required to perform an array test (AT), and after DO and GO are detected, the broken point of the signal lines can be repaired by a chemical vapor deposition (CVD) device. Hence, during the AT, a detection rate of DO and GO and an accuracy of determining defective positions play a very important role in the subsequent repairment, and concern a yield rate of the manufactured liquid crystal panels.

While designing the array substrate, as shown in FIG. 1, short-circuit rings a and b connected to a common electrode line C are usually provided at ends of signal lines A and B. The short-circuit rings a and b can introduce an instantaneous high voltage of static electricity existing in the display region into the common electrode line C, so as to function an Electro-Static Discharge (ESD) for the display region. However, due to the short-circuit rings a and b provided at the ends of the signal lines A and B are connected to the same common electrode line C, a phenomenon of signal backflow will occur while testing the signal lines A and B, thereby the AT detection rate and the test accuracy will be adversely affected.

To be specific, a basic principle for the phenomenon of signal backflow is described as follows. When a channel of a thin film transistor (TFT) in the short-circuit ring a or b is at a voltage of 0V, there are still carriers passing through the channel. When testing the signal lines A and B, a high-voltage signal applied onto the signal line A, after being introduced into the common electrode line C (as shown by the dotted line in FIG. 1) via the short-circuit ring a, will flow into the broken signal line B (as shown by the dotted line in FIG. 1) along the common electrode line C and the other short-circuit ring b, thereby such a phenomenon of signal backflow will occur on the signal line B. Due to this phenomenon, the high-voltage signal will be applied to the broken signal line B to which the high-voltage signal should not be applied. As a result, it is impossible to detect the break of the signal line B during the test, which will adversely affect the AT detection rate and the test accuracy. Moreover, along with an increase in the resolution of the display panel, the array substrate will be provided with more signal lines, so such signal backflow phenomenon will be more serious, which will thus result in a decrease in the AT detection rate.

Hence, when testing the array substrate, there is an urgent demand to avoid the signal backflow phenomenon, thereby to improve the AT detection rate and the test accuracy.

SUMMARY OF THE INVENTION

An object of the present invention is to provide an array substrate, a display device, a mother board and a detection method, so as to avoid a signal backflow phenomenon while testing the array substrate, thereby to improve an AT detection rate and a test accuracy.

In one aspect, the present invention provides an array substrate, including a plurality of signal lines, at least one signal line, at one end thereof, is provided with a short-circuit ring which is connected to the corresponding signal line, and a common electrode line through which the short-circuit rings are serially connected. The array substrate further includes a test line and a testing terminal pad.

Wherein, the testing terminal pad is connected to the common electrode line via the test line and configured to apply a negative voltage onto the common electrode line connected to the test line when testing the signal line.

According to the array substrate of the above embodiment of the present invention, at least one of the signal lines is provided with the short-circuit ring connected to the corresponding signal line at the end thereof, and the short-circuit rings are serially connected through the common electrode line. The array substrate is added with the test line and the testing terminal pad, the testing terminal pad is connected to the common electrode line via the test line and is configured to apply the negative voltage onto the common electrode line connected to the test line while testing the signal line. As a result, it is able to prevent the occurrence of signal backflow for a broken signal line when the short-circuit rings connected to the common electrode line are turned on, thus to ensure the detection of the broken signal line, and improve the AT detection rate and the test accuracy, thereby to improve a maintenance rate of the broken lines by a CVD device and improve a yield rate of the product.

In an alternative embodiment, the array substrate includes a display region and a peripheral region surrounding the display region, and the test line and the testing terminal pad are both arranged in the peripheral region.

Alternatively, in the array substrate, the short-circuit rings are arranged in the peripheral region.

Alternatively, in the array substrate, the signal line includes a gate signal line and/or a data signal line.

Alternatively, in the array substrate, the test line is made of a same material as that of the gate signal line and arrange on a layer identical to the gate signal line, or is made of a same material as that of the data signal line and arranged on a layer identical to the data signal line.

Alternatively, in the array substrate, the testing line and the testing terminal pad are made of metal.

Alternatively, the testing terminal pad is made of a same material as that of the gate signal line and arranged on a layer identical to the gate signal line, or is made of a same material as that of the data signal line and arranged on a layer identical to the data signal line.

Alternatively, in the array substrate, the short-circuit ring includes a first transistor and a second transistor.

A gate electrode and a source electrode of the first transistor are both connected to the signal line, and a drain electrode thereof is connected to the common electrode line.

A gate electrode and a source electrode of the second transistor are both connected to the common electrode line, and a drain electrode thereof is connected to the signal line.

In another aspect, one embodiment of the present invention provides a mother board including a plurality of the above-mentioned array substrates arranged in an array form and sharing a same base plate.

Alternatively, the mother board further includes a master testing terminal pad arranged at a region outside the array substrates.

The master testing terminal pad is connected to testing terminal pads in the respective array substrates via guide lines.

Alternatively, in the mother board, the master testing terminal pad is located at a peripheral region of the mother board.

Alternatively, in the mother board, number of the master testing terminal is one or more.

In yet another aspect, the present invention provides a detection method for the above-mentioned mother board, including:

while testing signal lines in array substrates of the mother board, applying a negative voltage onto a master testing terminal pad in the mother board.

In still yet another aspect, the present invention provides a display device including the above-mentioned array substrate.

DETAILED DESCRIPTION OF THE PREFERRED EMBODIMENTS

The array substrate, the display device, the mother board and the detection method thereof according to the embodiment of the present invention will be described hereinafter in conjunction with the drawings. Wherein, the shape and size of each member are not used to reflect a real scale but for illustrative purposes only.

Figure 1:
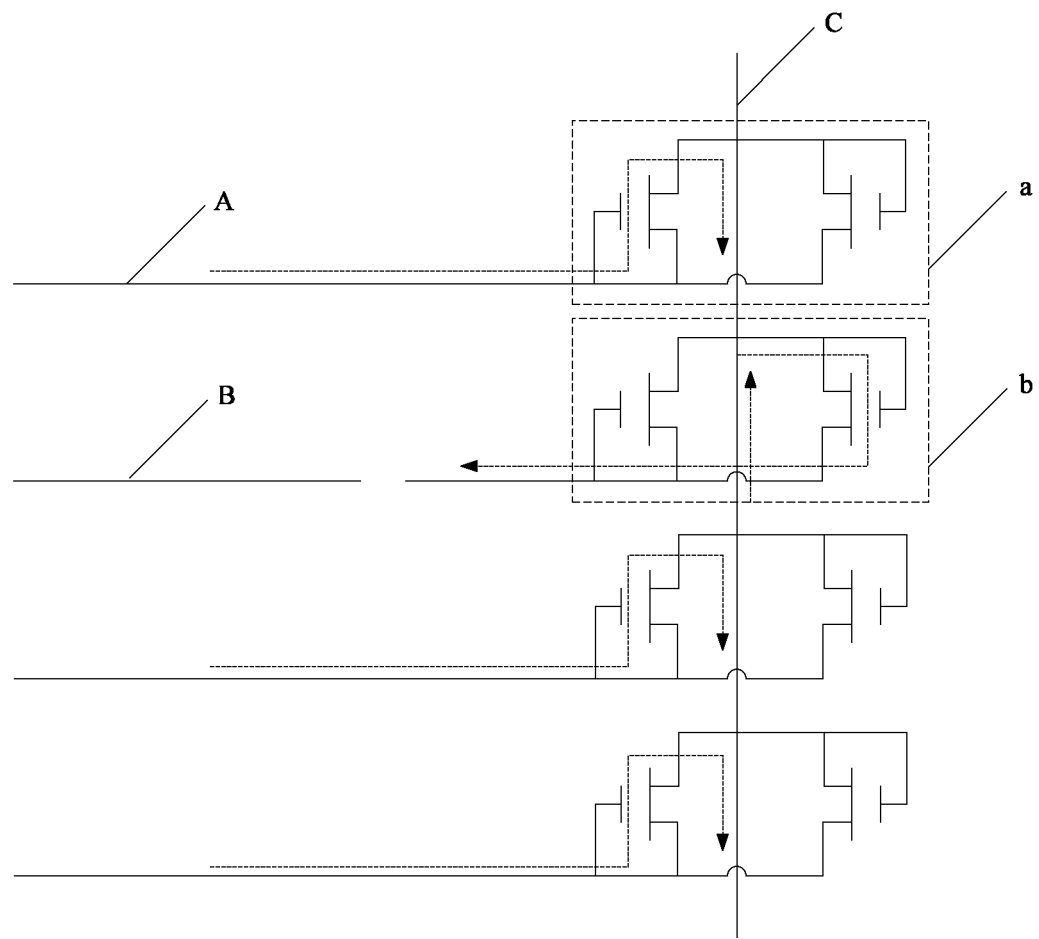
FIG. 1 is a schematic view showing a signal backflow phenomenon for a signal line in an existing array substrate.
Figure 2:
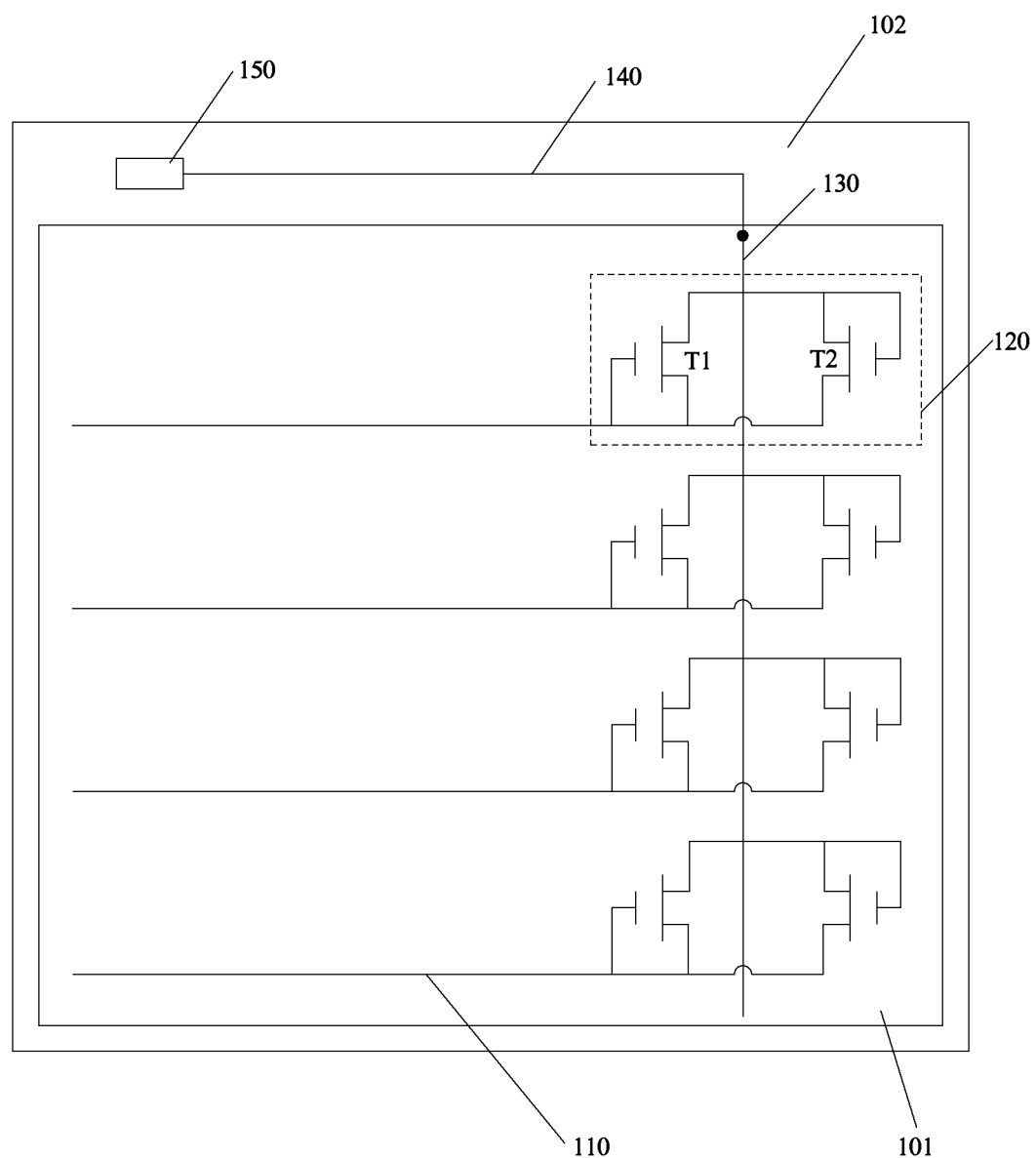
FIG. 2 is a schematic view showing an array substrate according to one embodiment of the present invention.

As shown in FIG. 2, an array substrate includes a plurality of signal lines 110, at least one signal line 110, at one end thereof, is provided with a corresponding short-circuit rings 120 which is connected to the corresponding signal line 110, and a common electrode line 130 through which the short-circuit rings are serially connected. The array substrate further includes a test line 140 and a testing terminal pad 150.

The testing terminal pad 150 is connected to the common electrode line 130 via the test line 140 and configured to apply a negative voltage onto the common electrode line 130 connected to the test line 140 while testing the signal line 110.

According to the array substrate of the embodiment of the present invention, at least one signal line 110 is provided with the short-circuit ring 120 at the end, the short-circuit ring 120 is connected to the corresponding signal line 110, and the short-circuit rings 120 are serially connected through the common electrode line 130. The array substrate is added with the test line 140 and the testing terminal pad 150, the testing terminal pad 150 is connected to the common electrode line 130 via the test line 140 and is configured to apply the negative voltage onto the common electrode line 130 connected to the test line 140 while testing the signal line 110. As a result, it is able to prevent the occurrence of signal backflow for a broken signal line 110 when the short-circuit rings 120 connected to the common electrode line 130 are turned on, thus to ensure the detection of the broken signal line 110, thereby to improve the AT detection rate and the test accuracy, improve a maintenance rate of the broken lines by a CVD device and improve a yield rate of the product.

During the implementation, as shown in FIG. 2, the array substrate may usually include a display region 101 and a peripheral region 102 surrounding the display region 101. In order not to adversely affect a normal operation of the display region, both the added test line 140 and the testing terminal pad 150 may be arranged in the peripheral region 102 when designing the array substrate. Usually, the short-circuit rings 120 connected to the ends of the signal lines 110 respectively are also arranged in the peripheral region 102.

During the implementation, in the array substrate, the signal line 101, at an end of which is arranged with the short-circuit ring 120, may be a gate signal line, or a data signal line, or both, which is not particularly defined herein.

During the implementation, in the array substrate, the test line 140 and the testing terminal pad 150 are usually made of a metal so as to facilitate the transmission of the negative voltage. Furthermore, the test line 140 may be made of a same material as that of the gate signal line and arranged on a layer identical to the gate signal line, or the test line 140 may be made of a same material as that of the data signal line and arranged on a layer identical to the data signal line. Also, the testing terminal pad 150 may be made of a material and arranged on a layer identical to the gate signal line or the data signal line. In this way, for the existing process for manufacturing the array substrate, it is unnecessary to provide additional processes for manufacturing the test line 140 and the testing terminal pad 150. As a result, it is able to reduce the production cost and improve the production efficiency.

Further, in the array substrate, the short-circuit ring 120 arranged at the end of the signal line 110 may be of various structures. To be specific, as shown in FIG. 2, the short-circuit ring may include a first transistor T1 and a second transistor T2. A gate electrode and a source electrode of the first transistor T1 are connected to the signal line 110, and a drain electrode of the first transistor T1 is connected to the common electrode line 130. A gate electrode and a source electrode of the second transistor T2 are connected to the common electrode line 130, and a drain electrode of the second transistor T2 is connected to the signal line 110. Of course, the short-circuit ring 120 may also be of any other structures in practical implementation, which will not be particularly defined herein.

Further, when manufacturing the array substrate, a plurality of array substrate regions arranged in a matrix form is formed on a mother board, and the mother board is arranged opposite to another mother board, on which a plurality of counterpart substrate regions arranged in a matrix form are formed, to form a cell, and then the mother boards are cut along the counterpart substrate regions and the array substrate regions, respectively, so as to form a plurality of small liquid crystal display panels.

Figure 3:
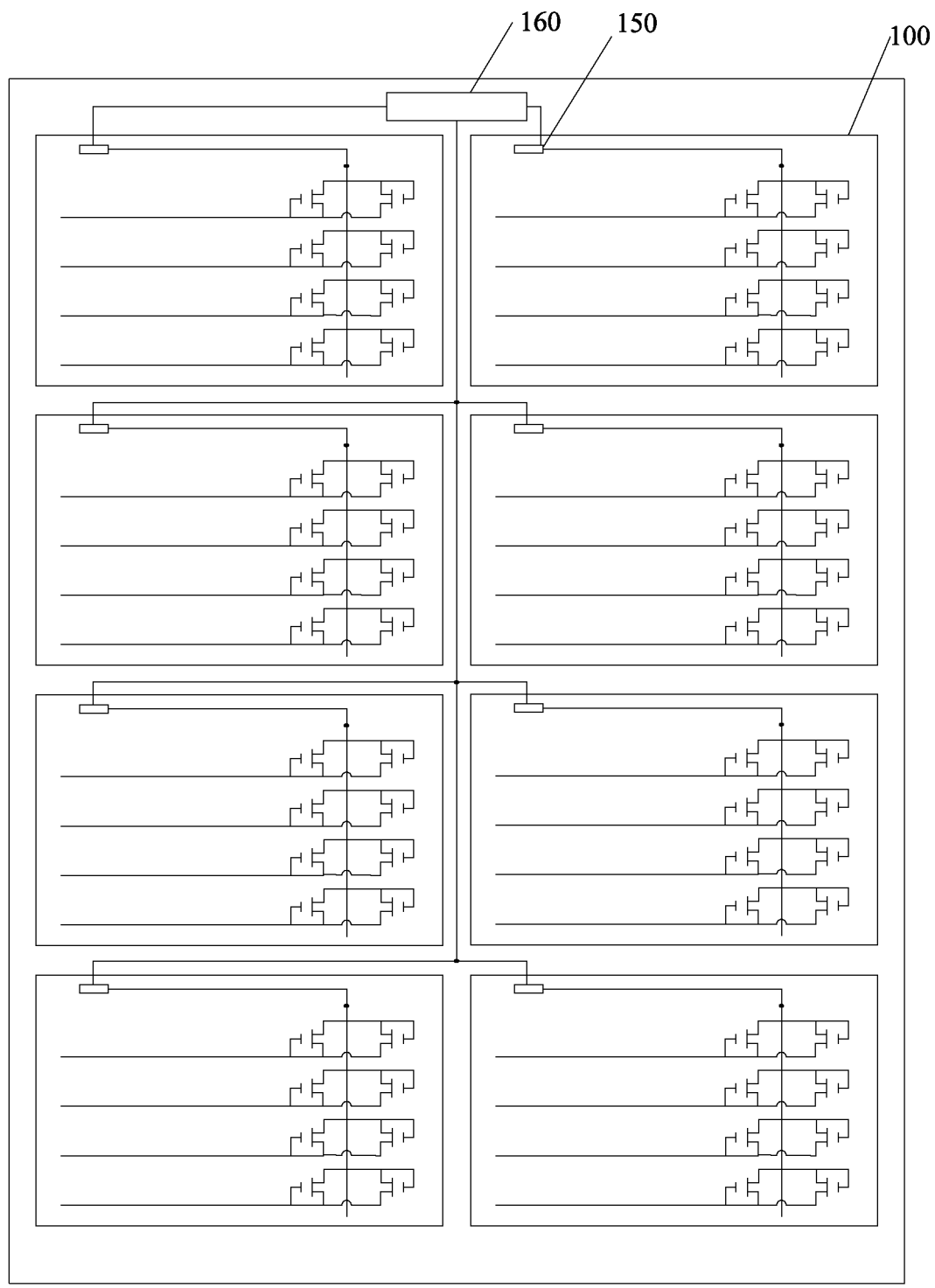
FIG. 3 is a schematic view showing a mother board according to one embodiment of the present invention.

Based on the above-mentioned manufacturing process, one embodiment of the present invention further provides a mother board which, as shown in FIG. 3, includes a plurality of the above-mentioned array substrates 100 arranged in an array form and sharing an identical base plate. The mother board works on the same principle as the above-mentioned substrate to solve the problem, so the implementation of the mother board may refer to that of the array substrate, which will not be repeated herein.

During the implementation, after the mother board is manufactured, it is required to test the signal lines 110 in the array substrates 100 included in the mother board, so it is required to apply a negative voltage onto the testing terminal pads 150 included in the array substrates 100 respectively. In order to facilitate the application of the negative voltage onto the testing terminal pads 150, as shown in FIG. 3, a master testing terminal pad 160 can be provided at a region of the mother board outside the array substrates 100, and the master testing terminal pad 160 is connected to the testing terminal terminals 150 in the array substrates 100 via a guide line. In this way, when testing, the negative voltage will be applied onto the testing terminal pads 150 in the array substrates 100 by merely applying the negative voltage onto the master testing terminal pad 160, and as a result, it is able to facilitate the testing.

During the implementation, in order to facilitate the application of the negative voltage, usually the master testing terminal pad 160 can be arranged at a peripheral region of the mother board, so that the general testing terminal pad 160 will be removed conveniently while cutting the liquid crystal display panels after the cell is formed.

It should be noted that, the number of the master testing terminal pads 160 arranged on the mother board is not particularly limited. For example, there may be one or more master testing terminal pads 160. The position of the general testing terminal pad 160 may be set in accordance with the specification of the mother board, which is not particularly defined herein.

Based on the same inventive concept, the present invention further provides a detection method for the above-mentioned mother board, including: while the testing signal lines 110 in the array substrates 100 of the mother board, applying a negative voltage onto the master testing terminal pad 160 in the mother board, so as to apply the negative voltage onto the testing terminal pads 150 in the array substrates 100 through the general testing terminal pad 160 and maintain the common electrode line 130 connected to the testing terminal pads 150 via the test line 140 at the negative voltage. As a result, it is able to prevent the occurrence of signal backflow for the broken signal line 110 when the short-circuit rings 120 connected to the common electrode line 130 are turned on, and ensure the detection of the broken signal line 110, thereby to improve the AT detection rate the test accuracy, improve the maintenance rate of the broken lines by the CVD device and improve the yield rate of the product.

Based on the same inventive concept, one embodiment of the present invention further provides a display device including the above-mentioned array substrate. The display device may be any product or member having a display function, such as a mobile phone, a flat panel PC, a TV, a display, a laptop PC, a digital photo frame, and a navigator, etc. The implementation of the display device may refer to that of the array substrate, which will not be repeated herein.

According to the array substrate, the display device, the mother board and the detection method of the embodiments of the present invention, at least one signal line, at one end thereof, is provided with a short-circuit ring which is connected to the corresponding signal line, and the short-circuit rings are serially connected through the common electrode line. The array substrate is added with the test line and the testing terminal pad, the testing terminal pad is connected to the common electrode line via the test line and is configured to apply the negative voltage onto the common electrode line connected to the test line while testing the signal line. As a result, it is able to prevent the occurrence of signal backflow on a broken signal line when the short-circuit rings connected to the common electrode line are turned on, thus to ensure the detection of the broken signal lines, and improve the AT detection rate the test accuracy, thereby to improve a maintenance rate of the broken lines by a CVD device and improve a yield rate of the product.

Obviously, a person skilled in the art may make further amendments and modifications without departing from the spirit and scope of the present invention. If these amendments and modifications fall within the scope of the appended claims and equivalents thereof, the present invention also intends to include them.

What is claimed is:

1. An array substrate, comprising a plurality of signal lines, at least one signal line, at one end thereof, is provided with a short-circuit ring, which is connected to the corresponding signal line, and one common electrode line through which a plurality of short-circuit rings are serially connected, wherein, the array substrate further comprises a test line that is directly connected to the common electrode line and different from the plurality of signal lines, and a testing terminal pad that is directly connected to the test line; and
the testing terminal pad is configured to apply a negative voltage onto the common electrode line connected to the test line when testing the signal line.

2. The array substrate according to claim 1, wherein the array substrate comprises a display region and a peripheral region surrounding the display region, and the test line and the testing terminal pad are both arranged in the peripheral region.

3. The array substrate according to claim 2, wherein the short-circuit rings are arranged in the peripheral region.

4. The array substrate according to claim 1, wherein the signal line is a gate signal line and/or a data signal line.

5. The array substrate according to claim 4, wherein the test line is made of a same material as that of the gate signal line and arranged on a layer identical to the gate signal line, or is made of a same material as that of the data signal line and arrange on a layer identical to the data signal line; and
the testing terminal pad is made of a same material as that of the gate signal line and arranged on a layer identical to the gate signal line, or is made of a same material as that of the data signal line and arranged on a layer identical to the data signal line.

6. The array substrate according to claim 4, wherein the test line and the testing terminal pad are made of metal.

7. The array substrate according to claim 1, wherein the short-circuit ring includes a first transistor and a second transistor;
a gate electrode and a source electrode of the first transistor are both connected to the signal line, and a drain electrode of the first transistor is connected to the common electrode line; and
a gate electrode and a source electrode of the second transistor are both connected to the common electrode line, and a drain electrode of the second transistor is connected to the signal line.

8. The array substrate according to claim 3, wherein the short-circuit ring includes a first transistor and a second transistor;
- a gate electrode and a source electrode of the first transistor are both connected to the signal line, and a drain electrode of the first transistor is connected to the common electrode line; and
- a gate electrode and a source electrode of the second transistor are both connected to the common electrode line, and a drain electrode of the second transistor is connected to the signal line.

9. The array substrate according to claim 4, wherein the short-circuit ring includes a first transistor and a second transistor;
- a gate electrode and a source electrode of the first transistor are both connected to the signal line, and a drain electrode of the first transistor is connected to the common electrode line; and
- a gate electrode and a source electrode of the second transistor are both connected to the common electrode line, and a drain electrode of the second transistor is connected to the signal line.

10. A mother board, comprising a plurality of array substrates arranged in an array form and sharing an identical base plate, the array substrate comprising a plurality of signal lines, at least on signal line, at one end thereof, is provided with a short-circuit ring, which is connected to the corresponding signal line, and one common electrode line through which a plurality of short-circuit rings are serially connected, wherein, the array substrate further comprises a test line that is directly connected to the common electrode line and different from the plurality of signal lines, and a testing terminal pad that is directly connected to the test line; and
- the testing terminal pad is configured to apply a negative voltage onto the common electrode line connected to the test line when testing the signal line.

11. The mother board according to claim 10, wherein the test line is made of a same material as that of a gate signal line and arranged on a layer identical to the gate signal line, or is made of a same material as that of a data signal line and arranged on a layer identical to the data signal line; and
- the testing terminal pad is made of a same material as that of the gate signal line and arranged on a layer identical to the gate signal line, or is made of a same material as that of the data signal line and arranged on a layer identical to the data signal line.

12. The mother board according to claim 10, wherein the short-circuit ring includes a first transistor and a second transistor;
- a gate electrode and a source electrode of the first transistor are both connected to the signal line, and a drain electrode of the first transistor is connected to the common electrode line; and
- a gate electrode and a source electrode of the second transistor are both connected to the common electrode line, and a drain electrode of the second transistor is connected to the signal line.

13. The mother board according to claim 10, wherein the array substrate comprises a display region and a peripheral region surrounding the display region, and the test line and the testing terminal pad are both arranged in the peripheral region.

14. The mother board according to claim 13, further comprising a master testing terminal pad arranged at a region outside the array substrates; and
- the master testing terminal pad is connected to testing terminal pads in the respective array substrates via guide lines.

15. The mother board according to claim 14, wherein the master testing terminal pad is located at a peripheral region of the mother board.

16. The mother board according to claim 15, wherein, the number of the master testing terminal pad is one or more.

17. A display device, comprising the array substrate according to claim 1.

* * * * *